US012619512B2

(12) United States Patent
Furukawa et al.

(10) Patent No.: US 12,619,512 B2
(45) Date of Patent: May 5, 2026

(54) SYSTEM FAILURE MONITORING DEVICE AND SYSTEM FAILURE MONITORING METHOD

(71) Applicant: Hitachi, Ltd., Tokyo (JP)

(72) Inventors: Shinya Furukawa, Tokyo (JP); Masaki Kimura, Tokyo (JP); Kazumasa Tobe, Tokyo (JP); Seiji Aguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/823,826

(22) Filed: Sep. 4, 2024

(65) Prior Publication Data

US 2025/0298715 A1      Sep. 25, 2025

(30) Foreign Application Priority Data

Mar. 19, 2024    (JP) ................................. 2024-043660

(51) Int. Cl.
*G06F 11/32*           (2006.01)
(52) U.S. Cl.
CPC .................................... *G06F 11/32* (2013.01)
(58) Field of Classification Search
CPC .... G06F 11/32; G06F 11/3476; G06F 11/079; H04L 43/08; H04L 63/1425
See application file for complete search history.

(56) References Cited

U.S. PATENT DOCUMENTS

| 7,305,546 B1 * | 12/2007 | Miller | ................... | H04L 69/162 |
| | | | | 713/153 |
| 10,248,533 B1 * | 4/2019 | Shah | ................... | G06F 11/3006 |
| 10,481,995 B1 * | 11/2019 | Mandali | ............. | G06F 16/9577 |

(Continued)

FOREIGN PATENT DOCUMENTS

| CN | 116069591 A | * | 6/2023 | ............ G06F 11/302 |
| JP | 2021-144401 A | | 9/2021 | |

OTHER PUBLICATIONS

Banga, Gaurav & Douglis, Fred & Rabinovich, Michael. (1999). Optimistic Deltas for WWW Latency Reduction. (Year: 1999).*

(Continued)

*Primary Examiner* — Ashish Thomas
*Assistant Examiner* — Catherine Marie Nguyen
(74) *Attorney, Agent, or Firm* — MATTINGLY & MALUR, PC

(57)          ABSTRACT

Provided is a system failure monitoring device capable of easily estimating a root cause of a system. A data collection unit acquires pod/calculation node information, which is configuration information regarding a pod that executes a process according to a request, and tracing data regarding the request processed by the pod. A determination unit including a processing time calculation unit and an abnormality degree calculation determination unit determines, for each of the requests, whether the request is an abnormal request relevant to an abnormality of a monitoring target system, based on the tracing data and the pod/calculation node information. A presentation unit including an abnormal request distribution calculation unit and an abnormal request visualization unit generates and presents visualized data indicating an abnormal request distribution obtained by plotting the abnormal request in a request space defined by a coordinate axis related to the requests.

6 Claims, 14 Drawing Sheets

(56)           References Cited

U.S. PATENT DOCUMENTS

| | | | |
|---|---|---|---|
| 2013/0169666 A1* | 7/2013 | Pacheco | G06F 11/323 |
| | | | 345/593 |
| 2018/0157478 A1* | 6/2018 | Wong | G06F 8/65 |
| 2019/0268360 A1* | 8/2019 | Yamanashi | H04L 67/12 |
| 2021/0019664 A1* | 1/2021 | Zhou | G06F 16/35 |
| 2022/0171794 A1* | 6/2022 | Kumaresan | G06F 16/355 |
| 2025/0284798 A1* | 9/2025 | Sterbling | G06F 11/3495 |

OTHER PUBLICATIONS

Fakhroutdinov, Kirill. "Website Latency: UML Timing Diagram Example." UML Diagrams, Jul. 8, 2016, www.uml-diagrams.org/website-latency-uml-timing-diagram-example.html. (Year: 2016).*

* cited by examiner (a)

| 131A | 131B | 131C | 131D | 131E | 131F | 131G |
|---|---|---|---|---|---|---|
| Trace ID | Span ID | Parent ID | Source pod | Destination pod | START TIME | END TIME |
| 55c94b0d | 8b8d57f6 | | API gateway | service1-44f2ec26 | 2023-11-04 09:31:08.5653016 | 2023-11-04 09:31:08.7837765 |
| 55c94b0d | 91b8a50e | 8b8d57f6 | service1-44f2ec26 | service2-096f9b6b | 2023-11-04 09:31:08.5755022 | 2023-11-04 09:31:08.6955016 |
| 55c94b0d | 2359cab3 | 8b8d57f6 | service1-44f2ec26 | service3-a2f5103e | 2023-11-04 09:31:08.5953078 | 2023-11-04 09:31:08.6468284 |
| 55c94b0d | 868ee8bd | 91b8a50e | service2-096f9b6b | service4-cdcfa4a6 | 2023-11-04 09:31:08.5774132 | 2023-11-04 09:31:08.6301984 |
| ... | ... | ... | ... | ... | ... | ... |

FIG. 6

| | 132A | 132B | 132C | 132D | 132E | 132F | 132G |
|---|---|---|---|---|---|---|---|
| ID | Pod name | Service name | CALCULATION NODE INFORMATION | Availability zone | UPDATE timestamp | Is available |
| 10 | service1-8e69e54d | Service1 | Null | Null | 2023-11-01 01:00:05 | False |
| ... | ... | ... | ... | ... | ... | ... |
| 50 | service1-44f2ec26 | Service1 | i-4ece0a57 | AZ1 | 2023-11-04 09:00:05 | Ture |
| 51 | service1-041cfb2f | Service1 | i-d39b2148 | AZ2 | 2023-11-04 09:00:05 | Ture |
| 52 | service2-dab7b266 | Service2 | i-4ece0a57 | AZ1 | 2023-11-04 09:00:05 | Ture |
| 53 | service2-096f9b6b | Service2 | i-d39b2148 | AZ2 | 2023-11-04 09:00:05 | Ture |
| 54 | service3-a2f5103e | Service3 | i-4ece0a57 | AZ1 | 2023-11-04 09:00:05 | Ture |
| 55 | service3-5b4001d3 | Service3 | i-d39b2148 | AZ2 | 2023-11-04 09:00:05 | Ture |
| 56 | service4-cdcfa4a6 | Service4 | i-d39b2148 | AZ2 | 2023-11-04 09:00:05 | Ture |
| 57 | service4-55c74da5 | Service4 | i-d39b2148 | AZ2 | 2023-11-04 09:00:05 | Ture |
| ... | ... | ... | ... | ... | ... | ... |

*FIG. 7*

| ID | Source pod | Destination pod | PROCESSING TIME | ABNORMALITY DEGREE | ABNORMALITY DETERMINATION RESULT | Span ID | DETERMINATION timestamp |
|---|---|---|---|---|---|---|---|
| | 133A | 133B | 133C | 133D | 133E | 133F 133G | 133H |
| 1 | service1-44f2ec26 | service2-096f9b6b | 60ms | 0.85 | True | 91b8a50e | 2023-11-04 10:20:00 |
| 2 | service1-44f2ec26 | service3-a2f5103e | 50ms | 0.5 | False | 2359cab3 | 2023-11-04 10:20:00 |
| 3 | service2-096f9b6b | service4-cdcfa4a6 | 60ms | 0.45 | False | 868ee8bd | 2023-11-04 10:20:00 |
| ... | ... | ... | | | ... | | ... |

FIG. 12

| ABNORMALITY ID | COORDINATE 1 | COORDINATE 2 | CALCULATION Timestamp |
|---|---|---|---|
| 1 | (4,1) | (5,1) | 2023-11-04 10:20:00 |
| 8 | (3,1) | (2,1) | 2023-11-04 10:20:00 |
| 12 | (3,2) | (2,4) | 2023-11-04 10:20:00 |
| 13 | (4,2) | (5,4) | 2023-11-04 10:20:00 |
| ... |  |  | ... |

135A　135B　135B　135C

1 3 5 1　ABNORMAL REQUEST INFORMATION

| ID | CENTROID Timestamp | COORDINATE AXIS NAME | BARYCENTRIC COORDINATE | TOTAL DISTANCE |
|---|---|---|---|---|
| 1 | 2023-11-04 01:20:00 | SERVICE ORDER | (3.5, 1.5) | 2.828 |
| 2 | 2023-11-04 01:20:00 | CALCULATION NODE ORDER | (3.5, 2.5) | 8.485 |
| ... | ... | ... | ... | ... |

135D　135E　135F　135G　135H

1 3 5 2　DISTRIBUTION INFORMATION

| | | Node1 | Node2 | Node1 | Node2 | Node1 | Node2 | Node2 | Node2 |
|---|---|---|---|---|---|---|---|---|---|
| | | Pod 1 (Service 1) | Pod 2 (Service 1) | Pod 3 (Service 2) | Pod 4 (Service 2) | Pod 5 (Service 3) | Pod 6 (Service 3) | Pod 7 (Service 4) | Pod 8 (Service 4) |
| Node1 | Pod 1 (Service 1) | | | 0.74 | 0.66 | 0.5 | 0.6 | | |
| Node2 | Pod 2 (Service 1) | | | 0.67 | 0.78 | 0.48 | 0.48 | | |
| Node1 | Pod 3 (Service 2) | | | | | | | 0.45 | 0.52 |
| Node2 | Pod 4 (Service 2) | | | | | | | 0.48 | 0.52 |
| Node1 | Pod 5 (Service 3) | | | | | | | | |
| Node2 | Pod 6 (Service 3) | | | | | | | | |
| Node2 | Pod 7 (Service 4) | | | | | | | | |
| Node2 | Pod 8 (Service 4) | | | | | | | | |

400C

401

401A

401B

| | | Node1 | Node1 | Node1 | Node2 | Node2 | Node2 | Node2 | Node2 |
|---|---|---|---|---|---|---|---|---|---|
| | | Pod 1 (Service 1) | Pod 3 (Service 2) | Pod 5 (Service 3) | Pod 2 (Service 1) | Pod 4 (Service 2) | Pod 6 (Service 3) | Pod 7 (Service 4) | Pod 8 (Service 4) |
| Node1 | Pod 1 (Service 1) | | 0.74 | 0.5 | | 0.66 | 0.6 | | |
| Node1 | Pod 3 (Service 2) | | | | | | | 0.45 | 0.52 |
| Node1 | Pod 5 (Service 3) | | | | | | | | |
| Node2 | Pod 2 (Service 1) | | 0.67 | 0.48 | | 0.78 | 0.48 | | |
| Node2 | Pod 4 (Service 2) | | | | | | | 0.48 | 0.52 |
| Node2 | Pod 6 (Service 3) | | | | | | | | |
| Node2 | Pod 7 (Service 4) | | | | | | | | |
| Node2 | Pod 8 (Service 4) | | | | | | | | |

SYSTEM FAILURE MONITORING DEVICE AND SYSTEM FAILURE MONITORING METHOD

CROSS-REFERENCE TO RELATED APPLICATION

The present application claims priority from Japanese application JP2024-043660, filed on Mar. 19, 2024, the content of which is hereby incorporated by reference into this application.

TECHNICAL FIELD

The present disclosure relates to a system failure monitoring device and a system failure monitoring method.

BACKGROUND ART

With the spread of distributed systems such as microservice architectures, problems are increasing in managing operations thereof. For example, when a failure occurs in a distributed system, it is necessary to quickly specify whether the failure is caused on an application or an infrastructure serving as a platform, and an administrator who operates the distributed system needs to shorten the time required for specifying the root cause.

In order to cope with the aforementioned problem, it is important to introduce a technology for monitoring an operation of a system and detecting a sign of a problem occurrence at an early stage. Such a technology can significantly shorten the time required for analyzing a root cause and can achieve system stability.

In this regard, PTL 1 discloses a technology of calculating a feature from data collected using a monitoring tool, and determining a cause of a failure in a microservice (a causal relationship between a failure of an infrastructure and a failure of an application) based on the feature. In this technology, a relationship between a feature and a teacher label is learned, and a cause of a failure in a microservice is determined using a feature acquired in an actual environment.

CITATION LIST

Patent Literature

PTL 1: JP 2021-144401 A

SUMMARY OF INVENTION

Technical Problem

In order to meet demands for various applications and services, a distributed system is generally designed to execute applications in a distributed manner using virtual processing units. In this case, it is expected that resources can be utilized more effectively, and scalability and flexibility can be improved. However, in such a distributed system, a large number of virtual processing units are involved, and interactions and dependency relationships between different applications executed in a virtual environment are complicated, making it difficult to specify a cause of a failure when the failure has occurred and efficiently analyze the failure.

In a case where the technology described in PTL 1 is applied to the above-described distributed system, it is necessary to acquire information indicating a failure of an application and information indicating a failure of a processing node, evaluate a hierarchical relationship and a dependency relationship between applications executed between different processing nodes, and also calculate a similarity between error messages in the different failure information. In addition, these evaluation values are held as features, and training data in which features are associated with acquired teacher labels is created. Using this training data, a failure prediction model that determines whether two pieces of failure information are relevant to each other is generated. In this case, a cause of a failure in the virtualized system can be efficiently analyzed, but there are the following problems.

Specifically, since it is necessary to accumulate failure data and train data, when a new application is introduced, it is necessary to collect and accumulate failure data and train data related to the new application. If the data is insufficient, the accuracy and reliability of the failure prediction model will be reduced. In addition, even in a case where an application is updated, there is a possibility that a particular failure cause and a particular operation that are not supported by the failure prediction model of the application before being updated exist in the application after the update, and thus, it is necessary to update the failure prediction model in order to improve accuracy and reliability. For this reason, in order to keep up with development styles such as agile development, in which applications are updated quickly, the cost for updating the failure prediction model is required.

The present disclosure has been made in view of the aforementioned problems, and an object of the present disclosure is to provide a system failure monitoring device and a system failure monitoring method capable of easily estimating a root cause of a system failure.

Solution to Problem

A system failure monitoring device according to an aspect of the present disclosure is a system failure monitoring device that monitors a monitoring target system including a plurality of components that execute processes according to requests, the system failure monitoring device including: a collection unit that collects configuration information regarding each of the components and request information regarding each of the requests processed by each of the components; a determination unit that determines, for each of the requests, whether the request is an abnormal request relevant to an abnormality of the monitoring target system, based on the configuration information and the request information; and a presentation unit that generates and presents visualized data indicating an abnormal request distribution obtained by plotting the abnormal request in a request space defined by a coordinate axis related to the requests.

Advantageous Effects of Invention

According to the present invention, it is possible to easily estimate a root cause of a system.

BRIEF DESCRIPTION OF DRAWINGS

FIG. 5 is a diagram illustrating an example of tracing data.

FIG. 6 is a diagram illustrating an example of pod/calculation node information.

FIG. 7 is a diagram illustrating an example of request abnormality degree information.

FIG. 12 is a diagram illustrating an example of abnormal request distribution information.

FIG. 13 is a diagram illustrating an example of an output screen.

DESCRIPTION OF EMBODIMENTS

Figure 1:
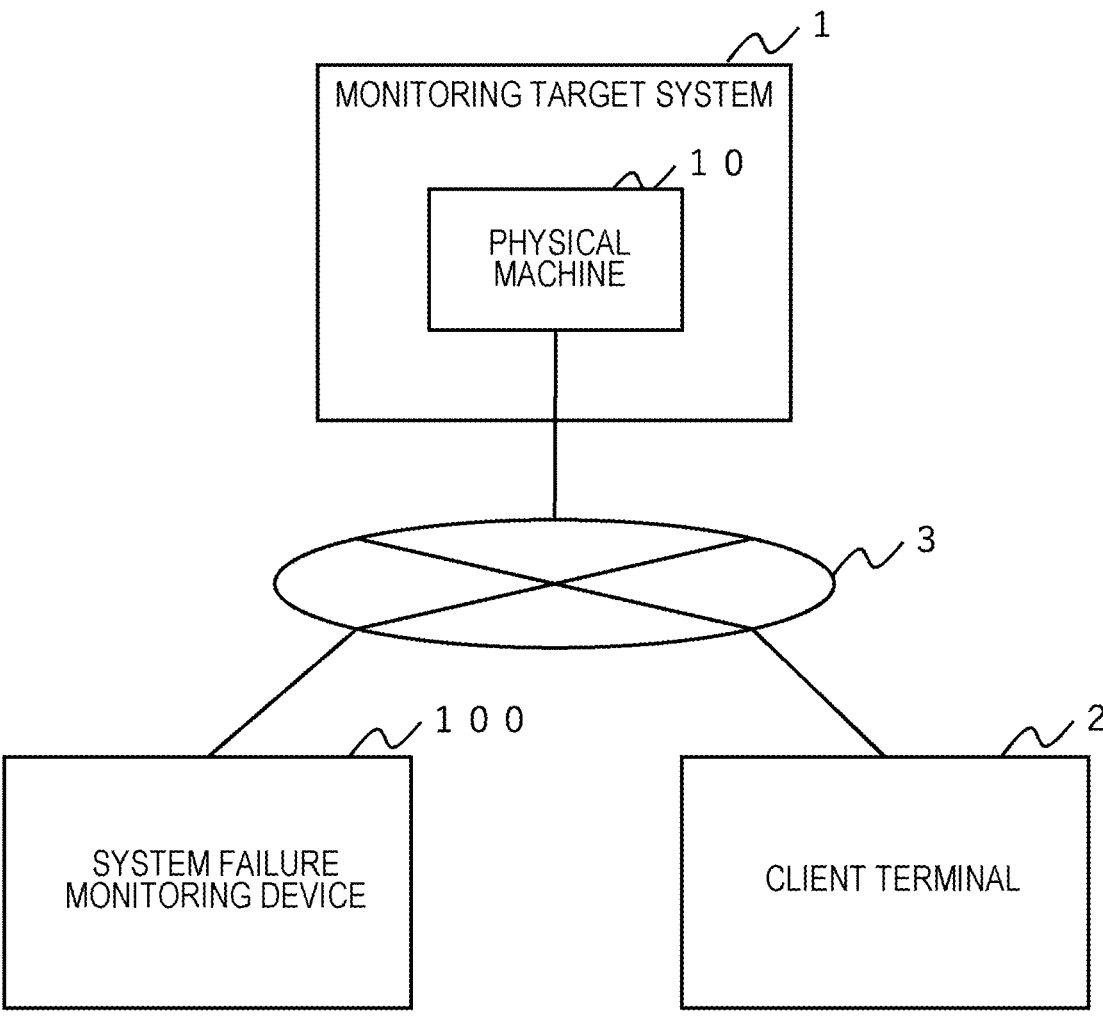
FIG. 1 is a diagram illustrating an example of a configuration of a system according to an embodiment of the present disclosure.

Hereinafter, embodiments of the present disclosure will be described with reference to the drawings. The following description and drawings are examples for describing the present disclosure, and some omissions and simplifications have been made as appropriate for clarity of description. The present disclosure can be implemented in various other forms. Unless otherwise specified, each component may be singular or plural. Positions, sizes, shapes, ranges, and the like of the components illustrated in the drawings may not represent actual positions, sizes, shapes, ranges, and the like in order to facilitate understanding of the disclosure. Therefore, the present disclosure is not necessarily limited to the positions, sizes, shapes, ranges, and the like disclosed in the drawings. In the following description, various types of information may be described using expressions such as a "table" and a "list", but the various types of information may be expressed using another data structure. The "XX table", the "XX list", and the like may be referred to as "XX information" to indicate that they do not depend on the data structure. In a case where expressions such as "identification information", "identifier", "name", "ID", and "number" are used in describing identification information, they can be replaced with each other.

First Embodiment

FIG. 1 is a diagram illustrating an example of a configuration of a system according to a first embodiment of the present disclosure. The system includes a monitoring target system 1, a client terminal 2, and a system failure monitoring device 100. The system failure monitoring device 100 is communicably connected to each of the monitoring target system 1 and the client terminal 2 via a network 3. The network 3 is, for example, a public network such as the Internet, a local area network (LAN), a wide area network (WAN), or the like.

The monitoring target system 1 is an information processing system for executing business operations, and is a distributed system that executes an application on a virtualization platform constructed on a plurality of physical machines 10. In the present embodiment, the monitoring target system 1 is constructed with microservices deployed on a virtualization platform. Microservices are in an architectural style in which a large-scale application is divided into multiple small independent services. Each microservice can be independently developed, deployed, and operated, focused on a particular business function or a set of functions. Microservices generally communicate with each other via a lightweight communication protocol (e.g., HTTP/REST or gRPC). In the monitoring target system 1, a single operation triggers multiple requests across multiple microservices, and these microservices cooperate with each other to provide all the functions of the application. Hereinafter, the microservices may be simply referred to as services.

The client terminal 2 is, for example, a server computer which is physical computer hardware owned by an operation management department of the monitoring target system 1. The client terminal 2 has a function of displaying information output from the system failure monitoring device 100 via the network 3.

The system failure monitoring device 100 monitors the monitoring target system 1, estimates a root cause of a failure that has occurred in the monitoring target system 1, generates screen information regarding the root cause, and outputs the screen information to the client terminal 2. Specifically, the root cause indicates whether the failure is caused by the application executed in the monitoring target system 1 or by the execution platform that executes the application.

Figure 2:
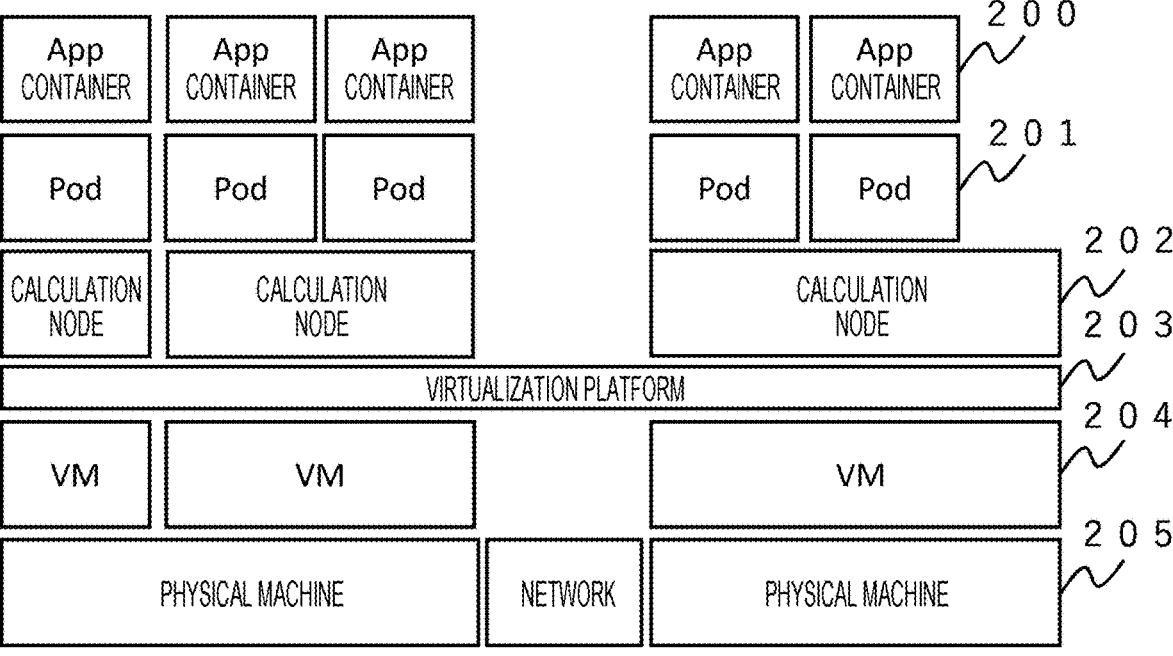
FIG. 2 is a diagram illustrating a configuration example of a monitoring target system.

FIG. 2 is a diagram illustrating a configuration example of the monitoring target system 1. In the present embodiment, the monitoring target system 1 is configured by a distributed system using microservices, and specifically, includes a physical machine 205, a virtual machine (VM) 204, a virtualization platform 203, a calculation node 202, a pod 201, and an application container (App container) 200 as illustrated in FIG. 2.

The physical machine 205 corresponds to the physical machine 10 in FIG. 1, and is a physical server that has hardware resources such as a central processing unit (CPU), a memory, and a storage, and is capable of executing an operating system. There may be a plurality of physical machines 205, which may be arranged in a plurality of data centers in a distributed manner. The virtual machine (VM) 204 is a virtual computer created on the physical machine 205 using a virtualization technology and having its own OS, application, and network setting. The virtualization platform 203 for executing an application is constructed by a plurality of VMs 204.

The calculation node 202 is a worker node in the virtualization platform 203, and is realized by the physical machine 205 or the VM 204 for executing the application container 200. Each calculation node 202 functions as a resource managed by the virtualization platform 203. The pod 201 is the smallest deployment unit deployed on the virtualization platform 203, and is a group of containers that share settings specific to shared storages, networking and other pods. The pod 201 corresponds to a microservice, which is a component that performs a process according to a request, and usually includes one or more application containers 200. The e application container 200 is a lightweight, portable execution environment including an application and its dependency. The application container 200 is executed in the pod 201 to realize a microservice. In this manner, the monitoring target system 1 combines these elements to realize efficient and flexible container orchestration.

Figure 3:
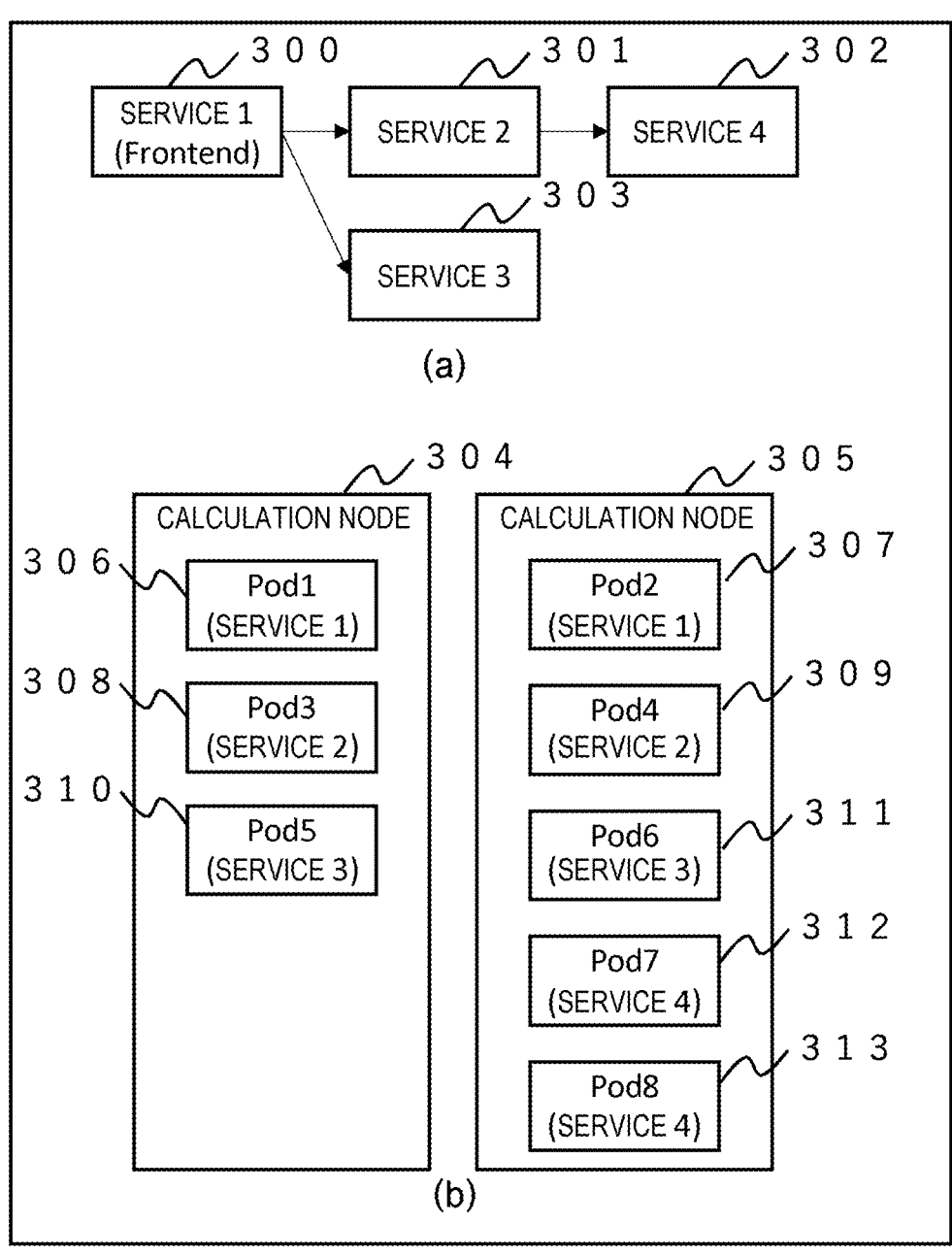
FIG. 3 is a diagram illustrating an example of a dependency relationship between microservices and an execution environment.

FIG. 3 is a diagram illustrating an example of a dependency relationship between microservices and an execution environment.

A plurality of services (services 300 to 303 in the example of FIG. 3(*a*)) provide functions in cooperation with each other by communicating with each other. Specifically, in a case where a request is issued to Service 1 in response to a user's operation or the like, Service 1 issues other requests to Services 2 and 3, respectively, in response to the request, processes responses from Services 2 and 3, and responds to the user. Service 2 also issues a request to Service 4, processes a response from Service 3, and responds to Service 1. In this manner, there are microservices that directly communicate with each other (Services 1 and 2, Services 1 and 3, and Services 2 and 4) and microservices that do not directly communicate with each other (Services 2 and 3 and Services 3 and 4). By drawing an edge between two services that directly communicate with each other, a service map indicating dependencies between the services is created as illustrated in FIG. 3(*a*).

In addition, as illustrated in FIG. 3(*b*), application containers 200 that provide the same service may exist on a plurality of calculation nodes 202. In the illustrated example, Pods 306, 308, and 310 corresponding to Services 1, 2, and 3, respectively, exist on a calculation node 304, which is a first calculation node 202. In addition, Pods 307, 309, 311, 312, and 313 corresponding to Services 1, 2, 3, and 4 exist on a calculation node 305, which is a second calculation node 202. In this manner, a plurality of application containers 200 for the same service exist on a plurality of calculation nodes 202, thereby improving processing capability and fault tolerance.

Figure 4:
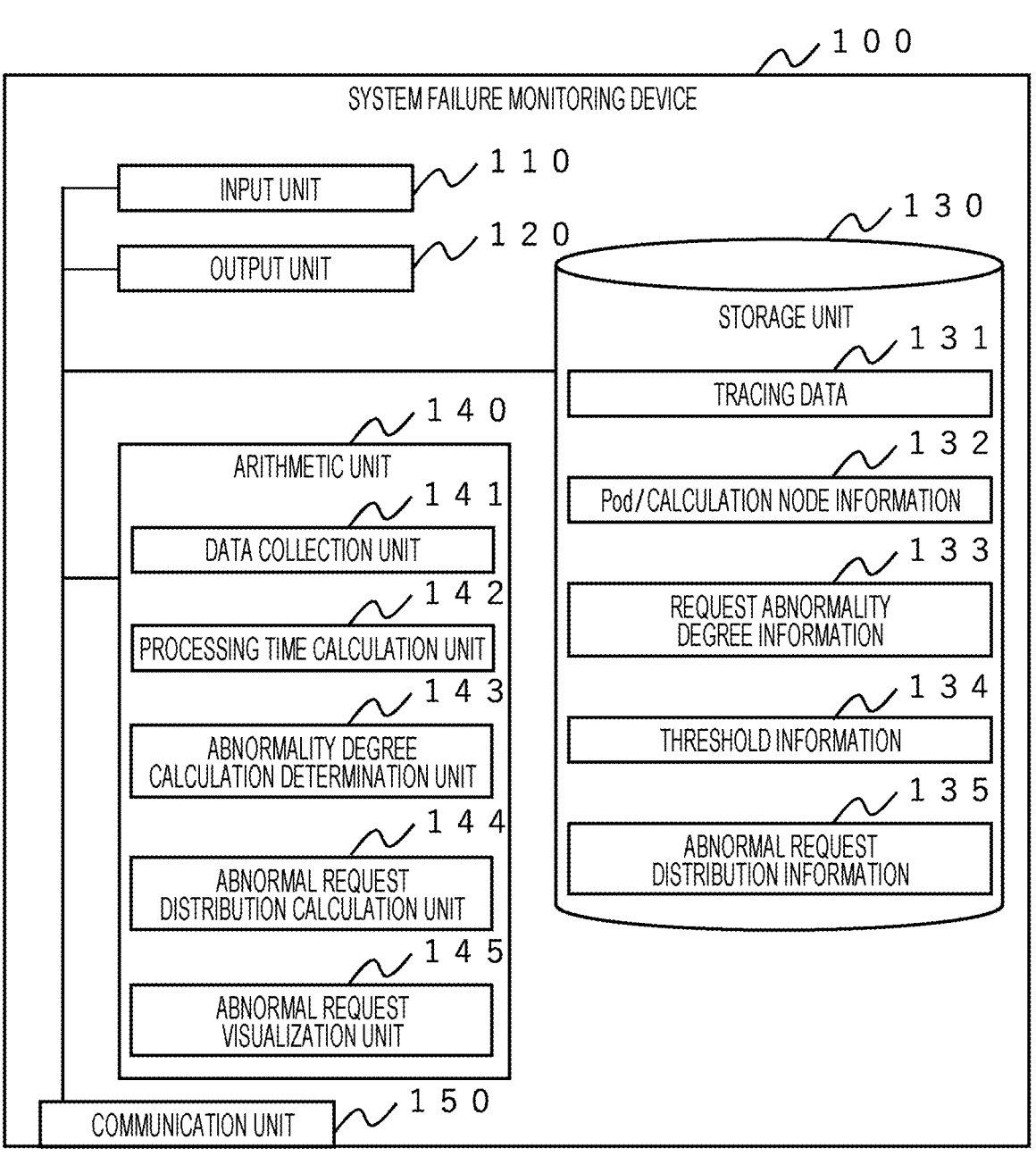
FIG. 4 is a functional block diagram illustrating an example of a functional configuration of a system failure monitoring device.

FIG. 4 is a functional block diagram illustrating an example of a functional configuration of the system failure monitoring device 100. As illustrated, the system failure monitoring device 100 includes an input unit 110, an output unit 120, a storage unit 130, an arithmetic unit 140, and a communication unit 150.

The input unit 110 is a functional unit that receives input information. Specifically, the input unit 110 receives input information input from a user via input devices such as a keyboard and a mouse included in the system failure monitoring device 100. In addition, the input unit 110 outputs the received input information to the arithmetic unit 140.

The output unit 120 is a functional unit that displays various types of information on a display device such as a display included in the system failure monitoring device 100.

The storage unit 130 is a functional unit that stores various types of information. In the present embodiment, the storage unit 130 stores tracing data 131, pod/calculation node information 132, request abnormality degree information 133, threshold information 134, abnormal request distribution information 135.

FIG. 5 is a diagram illustrating an example of the tracing data 131. The tracing data 131 is request information regarding each request processed by the microservice, and includes a parent-child relationship between microservices for a request, a transmission source, a transmission destination, a response time, and the like. Specifically, the tracing data 131 includes fields 131A to 131G.

The field 131A stores a trace ID (Trace ID) which is an ID for identifying a series of requests generated from a request transmitted from a user who uses the monitoring target system 1 to the monitoring target system 1 (more specifically, an application programming interface (API) endpoint). The field 131B stores a process ID (Span ID) for identifying a process by the pod 201 of a target request included in the series of requests. The field 131C stores a parent ID (Parent ID) that is an ID for identifying a parent request, which is a request one request before the target request is transmitted in the series of requests. When the target request is the request transmitted from the user to the monitoring target system 1, the parent ID is blank. The field 131D stores transmission source information indicating a transmission source pod (Source pod) that is a pod 201 from which the target request has been transmitted. The field 131E stores transmission destination information indicating a transmission destination pod (Destination pod) that is a pod 201 to which the target request has been transmitted. Note that the process according to the target request is executed in the transmission destination pod. The field 131F stores a start time that is a time at which the target request is transmitted. The field 131G stores an end time that is a time at which a response to the target request is sent to the transmission source (client or transmission source pod). The difference between the start time and the end time is a time for responding to the target request.

For example, the record in the second row of FIG. 5 indicates that a request transmitted from a transmission source pod "service1-44f2ec26" at a start time "2023-11-04 09:31:08.5755022" to a transmission destination pod "service2-096f9b6b" is processed by a transmission destination pod "service2-096f9b6b" and a response thereto is sent to the transmission source pod "service1-44f2ec26" at an end time "2023-11-4 09:31:08.6955016". In addition, for this process, the trace ID is "55c94b0d", the process ID is "91b8a50e", and the parent ID is "8b8d57f6".

FIG. 6 is a diagram illustrating an example of the pod/calculation node information 132. The pod identifier and calculation node information 132 is configuration information (system configuration information) regarding components of the monitoring target system 1, and include fields 132A to 132G.

The field 132A stores an ID which is identification information for identifying each record of the pod/calculation node information 132. The field 132B stores a pod name (Pod name) that is a name of a pod 201, and a unique identifier of the pod 201 in the same virtualization platform 203. The field 132C stores a service name (Service name) that is information indicating a microservice to which an application container 200 executed by the pod (the pod 201 identified in the field 132B of the same record) belongs. The field 132D stores calculation node information which is information indicating a calculation node 202 executing the pod. In a case where the pod is an erased pod that existed in the past but has been erased and no longer exists now, the calculation node information indicates "null". The field 132E stores zone information (Availability zone) indicating a data center to which the calculation node (the calculation node 202 executing the pod) belongs. In a case where the pod is an erased pod, the zone information indicates "null". The field 132F stores an update time (Update timestamp) that is a time (update timing) at which the pod information (the information of the fields 132B to 132E) is acquired and updated using the API of the virtualization platform 203. The field 132G stores an execution state (Is available) that is information indicating whether the pod exists at the update time. The execution state indicates "Ture" when the pod exists, and indicates "False" when the pod does not exist.

For example, the record having an ID "10" in FIG. 6 indicates that a pod 201 having a pod name "service1-8e69e54d" executed an application container 200 for "Service 1" but has been erased at an update time "2023-11-01 01:00:05" of the pod information. Furthermore, the record having an ID "50" indicates that a pod 201 having a pod name "service1-44f2ec26" is executing the application container 200 for "Service 1". The calculation node information for the pod 201 is "i-4ece0a57", and the data center where the calculation node 202 is located is "AZ1". Further, at the update time "2023-11-04 09:00:05" of the pod information, the pod 201 is running.

FIG. 7 is a diagram illustrating an example of the request abnormality degree information 133. The request abnormality degree information 133 is information indicating a relationship between each request and an abnormality of the monitoring target system 1, and includes fields 133A to 133H.

The field 133A stores an ID that is identification information for identifying each record of the request abnormality degree information 133. The field 133B stores transmission source information indicating a transmission source pod that has transmitted a request. The field 133C stores transmission destination information that is information indicating a transmission destination pod to receive a request. The field 133D stores a processing time required for the process according to the request. The processing time is a time obtained by subtracting a stand-by time from a response time, the response time being taken from when the transmission destination pod receives a request to when the transmission destination pod sends a response to the request, and the stand-by time being taken from when the transmission destination pod transmits a subordinate request that is another request according to the request to another pod to when the transmission destination pod receives a response from the other pod.

The field 133D stores an abnormality degree obtained by evaluating a degree of relevance to an abnormality of the monitoring target system 1 for the request. Specifically, the abnormality degree is a comparison value obtained by comparing the processing time of the request with a processing time of a comparison target request that is a past request as a comparison target. The comparison target request is a request having a predetermined homogeneous relationship with the request for which an abnormality degree is calculated, and is, for example, a request having the same transmission source pod and transmission destination pod as the transmission source pod and the transmission destination pod of the request.

In the present embodiment, the abnormality degree is a percentile of the processing time of the request with respect to the processing time of the comparison target request. More specifically, the percentile is a value indicating a position of the processing time of the request when processing times of comparison target requests are sorted in descending order or ascending order. For example, the 90th percentile indicates that 90% of the processing times of the comparison target requests is smaller than or equal to the processing time of the request. However, the abnormality degree is not limited to the percentile, and can be appropriately changed.

The field 133F stores an abnormality determination result that is a determination result obtained by determining whether an abnormality has occurred based on the abnormality degree. The field 133G stores a process ID for identifying the process performed according to the request. The field 133H stores an abnormality determination time (Determination timestamp) that is a time (abnormality determination timing) at which the information (the information in the fields 133B to 133G) related to the request is acquired and stored.

For example, the record in the first row of FIG. 7 indicates that a request is issued from a transmission source pod "service1-44f2ec26" to a transmission source pod "service2-096f9b6b", a processing time of the request is 120 ms, a percentile as an abnormality degree is 0.85, and it is determined that there is an abnormality based on the abnormality degree. In addition, a process ID for the request is "91b8a50e", and an abnormality determination time is "2023-11-4 10:20:00".

FIG. 4 will be referred back to. The arithmetic unit 140 is realized by, for example, a computer such as a CPU, and includes a data collection unit 141, a processing time calculation unit 142, an abnormality degree calculation determination unit 143, an abnormal request distribution calculation unit 144, and an abnormal request visualization unit 145.

The data collection unit 141 is a collection unit that collects the tracing data 131 and the pod/calculation node information 132 from the monitoring target system 1. Specifically, the data collection unit 141 reads the identifier of each request for the process inside the monitoring target system 1 via the network 3, acquires necessary data items "trace ID", "process ID", "parent ID", "transmission source information", "transmission destination information d", "start time", and "end time", and stores the acquired data items in the storage unit 130 as the tracing data 131. In addition, the data collection unit 141 reads the current configuration information from the API provided by the virtualization platform 203 of the monitoring target system 1, acquires necessary data items "pod name", "service name", "calculation node information", "zone information", "update time", and an execution state, and stores the acquired data items in the storage unit 130 as pod/calculation node information 132.

Note that the method for acquiring the tracing data 131 is not limited to the above-described example, and the tracing data may be acquired, for example, using an external distributed tracing tool (e.g., Jaeger or Zipkin).

The processing time calculation unit 142 is a functional unit that calculates a processing time for each request based on the tracing data 131.

The abnormality degree calculation determination unit 143 is a determination execution unit that calculates an abnormality degree corresponding to each request based on the processing time for each request, and determines whether there is an abnormality. Specifically, the abnormality degree calculation determination unit 143 determines whether there is an abnormality by determining whether the abnormality degree exceeds a threshold indicated by the threshold information 134.

The abnormal request distribution calculation unit 144 is a functional unit that calculates an abnormal request distribution obtained by plotting an abnormal request, which is a request determined to have an abnormality by the abnormality degree calculation determination unit 143, in a request space defined by a coordinate axis related to the requests, and stores the calculated abnormal request distribution in the storage unit 130 as abnormal request distribution information 135. The abnormal request distribution information 135 will be described in detail below. The coordinate axis of the abnormal request distribution is set in advance or by the user of the monitoring target system 1 according to a hypothesis to be verified as the root cause of the abnormality. In addition, a plurality of coordinate axes may be prepared. In this case, the abnormal request distribution calculation unit 144 calculates an abnormal request distribution for each coordinate axis. Furthermore, the abnormal request distribution calculation unit 144 calculates, for each abnormal request distribution, a total distance that is a sum of distances between a barycentric position of the abnormal request distribution on the request space and respective positions of the abnormal requests, as an evaluation value for evaluating the validity of the hypothesis.

The abnormal request visualization unit 145 is a functional unit that generates screen information including visualized data obtained by visualizing the abnormal request distribution calculated by the abnormal request distribution calculation unit 144, and provides the screen information to the client terminal 2.

The communication unit 150 is a functional unit that transmits and receives information to and from an external device. For example, the communication unit 150 acquires necessary data from the monitoring target system 1. In addition, the communication unit 150 transmits, to the client terminal 2, screen information including visualized data and screen information including a user interface (UI) for inputting information to the client terminal 2.

Figure 8:
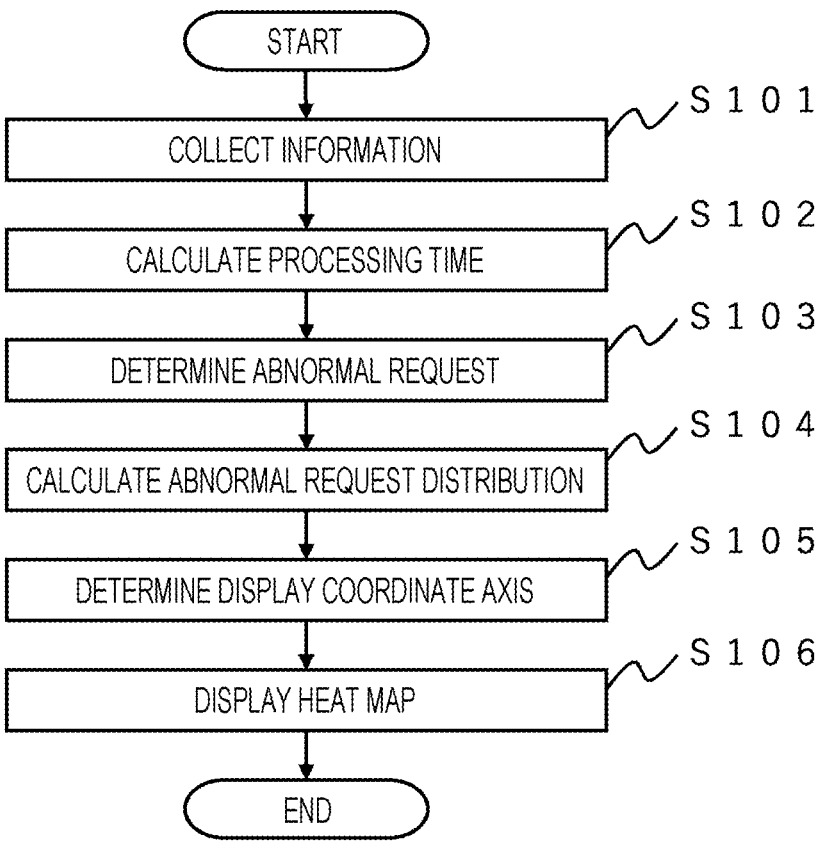
FIG. 8 is a flowchart for explaining an example of a system failure monitoring process.

FIG. 8 is a flowchart for explaining an example of a system failure monitoring process performed by the system failure monitoring device 100. The system failure monitoring process is started, for example, when the system failure monitoring device 100 receives an instruction to execute the system failure monitoring process from the client terminal 2 via the communication unit 150.

When the failure monitoring process is started, the data collection unit 141 of the system failure monitoring device 100 collects tracing data 131 and the pod/calculation node information 132 from the monitoring target system 1 (step S101).

Note that, in the virtualization platform 203, since the pod 201, which is a microservice executing unit, is frequently activated and erased, there is a possibility that information regarding the transmission source pod and the transmission destination pod included in the tracing data 131 does not exist in the pod/calculation node information 132 unless the pod/calculation node information 132 is updated in a timely manner. In order to avoid such a situation, in the present embodiment, information regarding the transmission source pod and the transmission destination pod acquired as the tracing data 131 is associated with pod information on each calculation node 202.

For example, in the examples of FIGS. 5 and 6, a request having a process ID "91b8a50e" is transmitted from a pod 201 of "service1-44f2ec26" as a transmission source pod to a pod 201 of "service2-096f9b6b" as a transmission destination pod. The pod 201 of "service1-44f2ec26" is deployed in a calculation node 202 of "i-4ece0a57", and the pod 201 of "service2-096f9b6b" is deployed in a calculation node 202 of "i-d39b2148". An update time of the pod/calculation node information 132 is "2023-11-04 09:00:05", and the pod of "service1-44f2ec26" and the pod 201 of "service2-096f9b6b" are running. These pieces of information are stored in the tracing data 131 and the pod/calculation node information 132 of the storage unit 130.

Subsequently, the processing time calculation unit 142 executes a processing time calculation process of calculating a processing time for each request (step S102).

Figure 9:
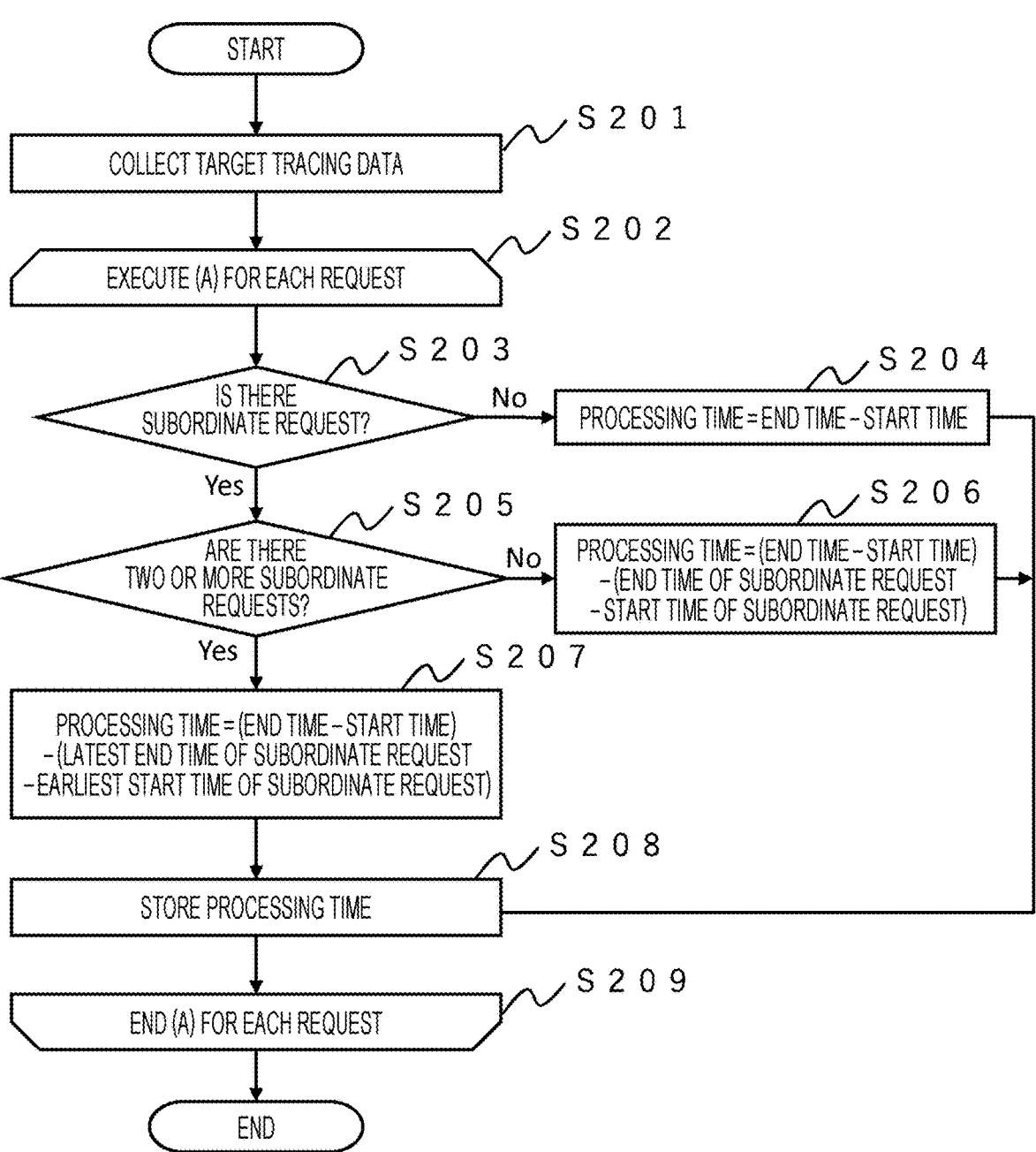
FIG. 9 is a flowchart for explaining an example of a processing time calculation process.

FIG. 9 is a flowchart for explaining an example of the processing time calculation process in step S102 of FIG. 8.

In the processing time calculation process, first, the processing time calculation unit 142 collects, from the tracing data 131 in the storage unit 130, target tracing data that is a record regarding requests transmitted in a specific time zone that is a time zone in which the processing time of the request is to be calculated (step S201). The specific time zone may be designated by, for example, the user.

Subsequently, the processing time calculation unit 142 executes a loop process A in which steps S203 to S208 are repeated for each request transmitted in the specific time zone based on the target tracing data (step S202).

In the loop process A, the processing time calculation unit 142 first determines whether there is a subordinate request of the target request based on the target tracing data (step S203). The subordinate request is a request transmitted to another pod 201 in the process according to the target request.

When there is no subordinate request ("No" in step S203), the processing time calculation unit 142 calculates a processing time of the target request by "end time of target request−start time of target request" (step S204). On the other hand, when there is a subordinate request ("Yes" in step S203), the processing time calculation unit 142 determines whether there are two or more subordinate requests (step S205).

When there is only one subordinate request ("No" in step S205), the processing time calculation unit 142 calculates a processing time of the target request by "(end time of target request−start time of target request)−(end time of subordinate request−start time of subordinate request)" (step S206). On the other hand, when there are two or more subordinate requests ("Yes" in step S205), the processing time calculation unit 142 calculates a processing time of the target request by "(end time of target request−start time of target request)−(latest end time of subordinate request−earliest start time of subordinate request)" (step S207).

In the example of FIG. 5, a request having a process ID "91b8a50e" is transmitted from a pod 201 of "service1-44 f2ec26" to a pod 201 of "service2-096f9b6b", and a response time, which is a difference between the start time and the end time is 120 ms. Furthermore, a subordinate request of the request having the process ID "91b8a50e" is transmitted from a pod 201 of "service2-096f9b6b" to a pod 201 of "service4-cdcfa4a6", and a response time is 60 ms. Therefore, the processing time of the request having the process ID "91b8a50e" is 60 ms (120 ms-60 ms) obtained by subtracting a stand-by time, which is the response time of the subordinate request, from 120 ms, which is the response time of the request.

The processing time calculation unit 142 stores the calculated processing time in the request abnormality degree information 133 (step S208).

Then, when steps S203 to S208 are executed for all the requests transmitted in the specific time zone, the processing time calculation unit 142 ends the loop process A (step S209), and ends the processing time calculation process.

Note that the method of calculating the processing time of the request is not limited to the above-described example, and the processing time may be calculated, for example, by embedding a software development kit (SDK) as a monitoring tool capable of monitoring a processing time in a source code of each microservice, and acquiring a response time and a stand-by time for each request from the monitoring tool.

The description returns to the system failure monitoring process of FIG. 8. When the processing time of each request is calculated, the abnormality degree calculation determination unit 143 compares the processing time of each request with processing times of past requests as comparison targets, and executes an abnormality determination process of determining an abnormal request relevant to an abnormality of the monitoring target system 1 (step S103).

Figure 10:
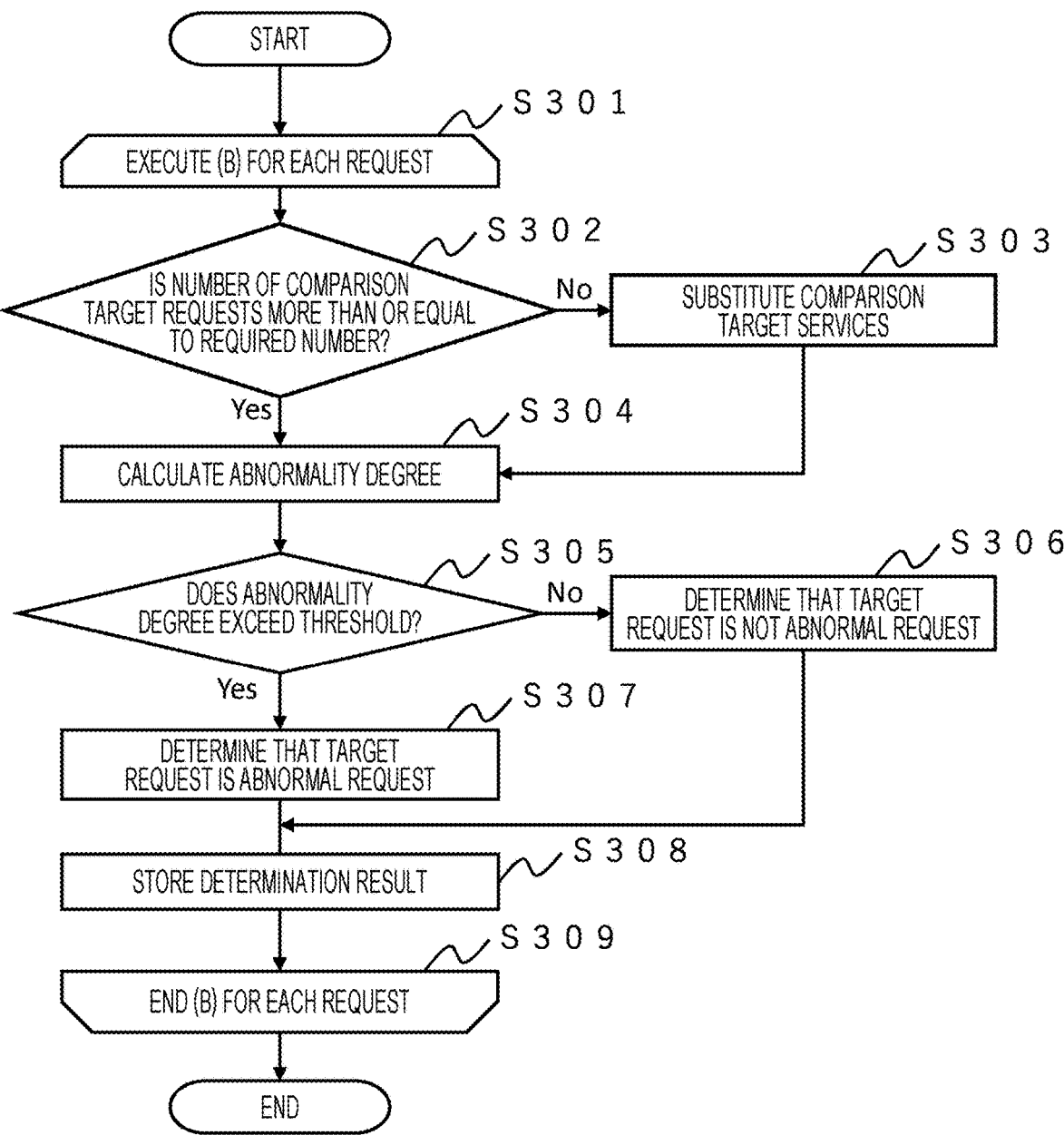
FIG. 10 is a flowchart for explaining an example of an abnormality determination process.

FIG. 10 is a flowchart for explaining an example of the abnormality determination process in step S103 of FIG. 8.

In the abnormality determination process, the abnormality degree calculation determination unit 143 starts B that executes the loop process A in which steps S302 to S308 are repeated for each request transmitted in the specific time zone based on the target tracing data (step S301).

In the loop process B, first, the abnormality degree calculation determination unit 143 specifies a transmission source pod and a transmission destination pod of the target request based on the tracing data 131, and determines whether the number of comparison target requests, which are past requests having the same transmission source pod and transmission destination pod as the transmission source pod and the transmission destination pod of the target request, is or more than or equal to a predetermined required number (step S302). The required number is set to a value sufficient: calculating an abnormality degree, for example, by an administrator who operates the system failure monitoring device 100.

When the number of comparison target requests is less than the required number ("No" in step S302), the abnormality degree calculation determination unit 143 specifies a transmission source service to which the transmission source pod of the target request belongs and a transmission destination service to which the transmission destination pod of the target request belongs based on the tracing data 131 and the pod/calculation node information 132, and substitutes requests having the same transmission source service and transmission destination service as the transmission source service and the transmission destination service as comparison target requests (step S303).

When the number of comparison target requests is more than or equal to the required number ("No" in step S302), or when the comparison target requests are substituted (when step S303 ends), the abnormality degree calculation determination unit 143 calculates a percentile of the processing time of the target request with respect to the processing times of all the comparison target requests as an abnormality degree of the target request (step S304). Specifically, the abnormality degree (percentile) is calculated by dividing the number of comparison target requests having processing times smaller than the processing time of the target request by the total number of comparison target requests.

The abnormality degree calculation determination unit 143 compares the abnormality degree with a threshold indicated by the threshold information 134, and determines whether the abnormality degree exceeds the threshold (step S305).

When the abnormality degree does not exceed the threshold ("No" in step S305), the abnormality degree calculation determination unit 143 determines that the target request is a normal request that is not an abnormal request relevant to an abnormality of the monitoring target system 1 (step S306). On the other hand, when the abnormality degree exceeds the threshold ("Yes" in step S305), the abnormality degree calculation determination unit 143 determines that the target request is an abnormal request (step S307). Then, the abnormality degree calculation determination unit 143 stores a determination result in step S306 or S307 as an abnormality determination result in the request abnormality degree information 133 (step S308).

For example, in the example of FIG. 5, a processing time of a request having a process ID "91b8a50e" is 60 ms. It is assumed that an abnormality degree (percentile) of the request calculated from a history of comparison target requests transmitted from a pod 201 of "service1-44f2ec26" to a pod 201 of "service2-096f9b6b" is 85% (0.85), while the threshold is 65%. In this case, since the abnormality degree exceeds the threshold, the request having the process ID "91b8a50e" is determined to be an abnormal request.

Then, when steps S303 to S308 are executed for all the requests transmitted in the specific time zone, the abnormality degree calculation determination unit 143 ends the loop process B (step S309), and ends the abnormality determination process.

The description returns to the system failure monitoring process of FIG. 8. Based on the request abnormality degree information 133, the abnormal request distribution calculation unit 144 executes a distribution calculation process of calculating an abnormal request distribution that is a distribution of abnormal requests (step S104).

Figure 11:
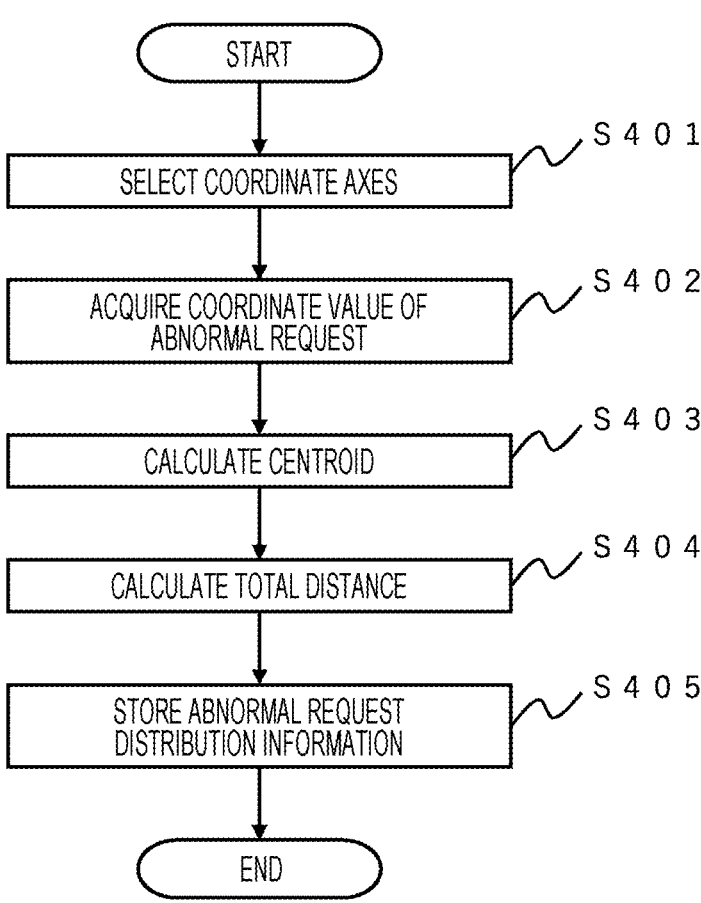
FIG. 11 is a flowchart for explaining an example of a distribution calculation process.

FIG. 11 is a flowchart for explaining an example of the distribution calculation process in step S104 of FIG. 8. Note that a plurality of coordinate axes defining an abnormal request distribution is prepared in advance, and the distribution calculation process to be described below is performed for each coordinate axis.

In the distribution calculation process, the abnormal request distribution calculation unit 144 first selects coordinate axes (X-axis, Y-axis) for calculating an abnormal request distribution from the coordinate axes prepared in advance (step S401).

In the present embodiment, at least two coordinate axes are prepared according to two hypotheses to be verified as a root cause of an abnormality. The first hypothesis is a hypothesis for verifying an application-relevant failure, and is a hypothesis that "the distribution of abnormal requests is biased to specific services". In this case, the corresponding coordinate axis is a coordinate axis (service-order coordinate axis) on which abnormal requests having the same transmission source service and the same transmission destination service are plotted at the same position. The second hypothesis is a hypothesis for verifying an execution platform (infrastructure)-relevant failure, and is a hypothesis that "the distribution of abnormal requests is biased to specific calculation nodes". In this case, the corresponding coordinate axis is a coordinate axis (calculation node-order coordinate axis) on which abnormal requests having the same transmission source calculation node and the same transmission destination calculation node are plotted at the same position. Note that the coordinate axes are not limited thereto, and a coordinate axis may be appropriately added according to a hypothesis to be verified about a cause of a failure.

The abnormal request distribution calculation unit 144 acquires a coordinate value indicating a position of each abnormal request in a request space defined by the selected coordinate axes (step S402). The abnormal request distribution calculation unit 144 calculates a position $(x_C, y_C)$ of the centroid of the abnormal request distribution in the request space defined by the selected coordinate axes (step S403). The position $(x_C, y_C)$ of the centroid between abnormal requests is calculated by respective average values on the X-axis and the Y-axis of the abnormal requests as represented by Formula 1. Note that, in Formula 1, N denotes the number of abnormal requests, and $(x_i, y_i)$ denotes a position of an i-th abnormal request.

$$x_c = \frac{\sum_{i=1}^{N} x_i}{N}, \; y_c = \frac{\sum_{i=1}^{N} y_i}{N} \qquad \text{[Formula 1]}$$

For all abnormal requests, the abnormal request distribution calculation unit 144 calculates a total distance that is a sum of distances from the positions of the abnormal requests to the centroid (step S404). For example, a distance $L_i$ from a position of an abnormal request i to the centroid is calculated by Formula 2, and a total distance $L_{total}$ is calculated by Formula 3.

$$L_i = \sqrt{(x_i - x_c)^2 + (y_i - y_c)^2} \qquad \text{[Formula 2]}$$

$$L_{total} = \sum_{i=1}^{N} L_i \qquad \text{[Formula 3]}$$

For example, it is assumed that positions where four abnormal requests are plotted in the request space on the service-order coordinate axis are represented by (4,1), (3,1), (3,2), and (4,2). In this case, the centroid of the abnormal request distribution is (3.5, 1.5), and the total distance, which is the sum of distances between the positions of the respective abnormal requests and the position of the centroid, is 2.828.

In Formulas 2 and 3, the distance is a Euclidean distance. In this case, a smaller total distance indicates that an abnormal request is more biased in the request space on the selected coordinate axis, that is, the validity of the hypothesis corresponding to the selected coordinate axis is higher. Note that the distance is not limited to the Euclidean distance as long as the total distance can express the degree of distribution of the abnormal requests, and may be, for example, a Manhattan distance.

Subsequently, the abnormal request distribution calculation unit 144 stores the positions of the respective abnormal requests and the total distance in the storage unit 130 as the abnormal request distribution information 135 (step S405), and ends the process.

FIG. 12 is a diagram illustrating an example of the abnormal request distribution information 135. The abnormal request distribution information 135 illustrated in FIG. 12 includes abnormal request information 1351 and distribution information 1352.

The abnormal request information 1351 includes fields 135A to 135C. The field 135A stores an abnormality ID that is an ID for identifying an abnormal request. The field 135B is provided for each coordinate axis and stores a coordinate value of an abnormal request on the coordinate axis. In the example of FIG. 12, there are two coordinate axes, and accordingly, there are also two fields 135B. The field 135C stores a coordinate value calculation time (Calculation timestamp) that is a time at which the coordinate value of the abnormal request is calculated and stored.

The distribution information 1352 includes fields 135D to 135H. The field 135D stores an ID for identifying a centroid between a set of abnormal requests in a specific time zone when the abnormal requests are plotted in a request space on a specific coordinate axis. The field 135E stores a centroid calculation time (Centroid timestamp) that is a time at which the centroid between the abnormal requests is calculated and stored. The field 135F stores a coordinate axis name for identifying a coordinate axis. The field 135G stores a barycentric coordinate that is a coordinate value of the centroid. The field 315H stores a total distance with respect to the centroid.

For example, the record in the first row of the abnormal request information 1351 indicates that, regarding an abnormal request having an abnormality degree ID "1", its coordinate in a space on a service-order coordinate axis is (4,1), its coordinate in a space on a calculation node-order coordinate axis is (5,1), and a coordinate value calculation time at which the coordinate values are calculated is "2023-11-04 10:20:00". The record in the first row of the distribution information 1352 indicates that a coordinate of the centroid between a set of abnormal requests in a specific time zone when the abnormal requests are plotted in the request space on the service-order coordinate axis is (3.5, 1.5), and a total distance is 2.828.

The description returns to the system failure monitoring process of FIG. 8. The abnormal request visualization unit 145 determines display coordinate axis, which is a coordinate axis to be displayed, based on the abnormal request distribution information 135 (step S105). Specifically, the abnormal request visualization unit 145 determines, as a display coordinate axis, a coordinate axis having the shortest total distance among the coordinate axes included in the abnormal request distribution information 135. In the example of FIG. 12, the total distance on the service-order coordinate axis is 2.828, and the total distance on the calculation node-order coordinate axis is 8.485. In this case, since the distribution of abnormal requests is biased on the service-order coordinate axis having the shorter total distance, the abnormal request visualization unit 145 determines that it highly likely that a failure has been caused on the application side, and determines the service order coordinate axis as a display coordinate axis to be used in screen information.

Subsequently, the abnormal request visualization unit 145 outputs screen information indicating an abnormal request distribution to the client terminal using the determined display coordinate axis 2 to display the screen information (step S106), and ends the process.

FIG. 13 is a diagram illustrating an example of the screen information displayed by the client terminal 2. The screen information 400 illustrated in FIG. 13 is a screen of a heat map visualizing communication between pods.

Specifically, the screen information 400 is an example in which a service-order coordinate is selected as a display coordinate. In this case, services from which abnormal requests are transmitted are arranged in order of service on an X-axis 400A, and abnormal requests to which the abnormal requests are transmitted are arranged in order of service on an Y-axis 400B. A color corresponding to an abnormality degree of an abnormal request is given as visual information to a display unit which is a plot of the abnormal request. For example, in a display unit 400C, an abnormal request transmitted from Pod 2 to Pod 4 is plotted, and an abnormality degree is 0.76. In addition, the screen information 400 indicates that requests having high abnormality degrees are concentrated in requests transmitted from Service 1 to Service 2, which indicates that there is a high possibility that a failure occurs in an application corresponding to Service 2.

Screen information 401 is a reference example in which a calculation node-order coordinate is selected as a display coordinate. In this case, specifically, calculation nodes from which abnormal requests are transmitted are arranged in order of calculation node on an X-axis 400A, and calculation nodes to which the abnormal requests are transmitted are arranged in order of calculation node on a Y-axis 400B. In this example, requests having high abnormality degrees are distributed, which indicates that there is a low possibility that a failure has occurred in the execution platform. Therefore, in this example, the abnormal request visualization unit 145 displays the screen information 400 but does not display the screen information 401.

As described above, according to the present embodiment, the data collection unit 141 acquires pod/calculation node information 132, which is configuration information regarding pods 202 that execute processes according to requests, and tracing data 131 regarding the requests processed by the pods 202. A determination unit including the processing time calculation unit 142 and the abnormality degree calculation determination unit 143 determines, for each of the requests, whether the request is an abnormal request relevant to an abnormality of the monitoring target system 1, based on the tracing data 131 and the pod/calculation node information 132. A presentation unit including the abnormal request distribution calculation unit 144 and the abnormal request visualization unit 145 generates and presents screen information indicating an abnormal request distribution obtained by plotting the abnormal request in a request space defined by a coordinate axis related to the requests. As a result, by checking the abnormal request distribution, a root cause of a system failure can be estimated. Therefore, the root cause of the system failure can be easily estimated. In addition, as a result, it is possible to shorten the time required for initial response to investigate the cause of the failure, making it possible to efficiently and quickly manage the operation of the microservice architecture.

Furthermore, in the present embodiment, since it is determined whether the request is an abnormal request by comparing a processing time of the request with a past request as a comparison target, it is not necessary to construct a machine learning model or the like by accumulating failure data, making it possible to easily estimate a root cause with high reliability at low cost.

Furthermore, in the present embodiment, since the processing time of the request is a time obtained by subtracting a stand-by time from a response time taken before a response to the request is sent after the request is received, it is possible to accurately evaluate a time related to the process according to the request in each pod 201, making it possible to improve the root cause estimating accuracy.

Furthermore, in the present embodiment, the comparison target request is a request having the same transmission source pod and the same transmission destination pod as the target request. In this case, it is possible to improve the root cause estimating accuracy.

Furthermore, in the present embodiment, when the number of requests having the same transmission source pod and the same transmission destination pod as the target request is smaller than a required number, a request having the same service provided by the transmission source pod and the same service provided by the transmission destination pod as the target request is substituted as the comparison target request. In this case, even in a case where the number of requests having the same transmission source pod and the same transmission destination pod as the target request is small, it is possible to suppress a deterioration in root cause estimating accuracy.

Furthermore, in the present embodiment, the presentation unit selects a display coordinate axis that is a coordinate axis to be displayed from a plurality of coordinate axes different from each other, based on a total distance that is a sum of distances between positions of respective abnormal requests in the request space and a position of the centroid between the abnormal requests for each of the plurality of coordinate axes. Therefore, it is possible to display screen information suitable for estimating a root cause, making it possible to more easily estimate the root cause.

Furthermore, in the present embodiment, the coordinate axis can be set by a user. Therefore, it is possible to set an appropriate coordinate axis according to a hypothesis to be verified as the root cause of the abnormality, making it possible to estimate and verify various causes.

Second Embodiment

The present embodiment corresponds to a modification of the first embodiment. Therefore, differences from the first embodiment will be mainly described below. The present embodiment is different from the first embodiment mainly in that error log information indicating a history of abnormalities related to the requests that have occurred in the system failure monitoring device 100 is used as request information regarding the requests instead of the tracing data 131.

Figure 14:
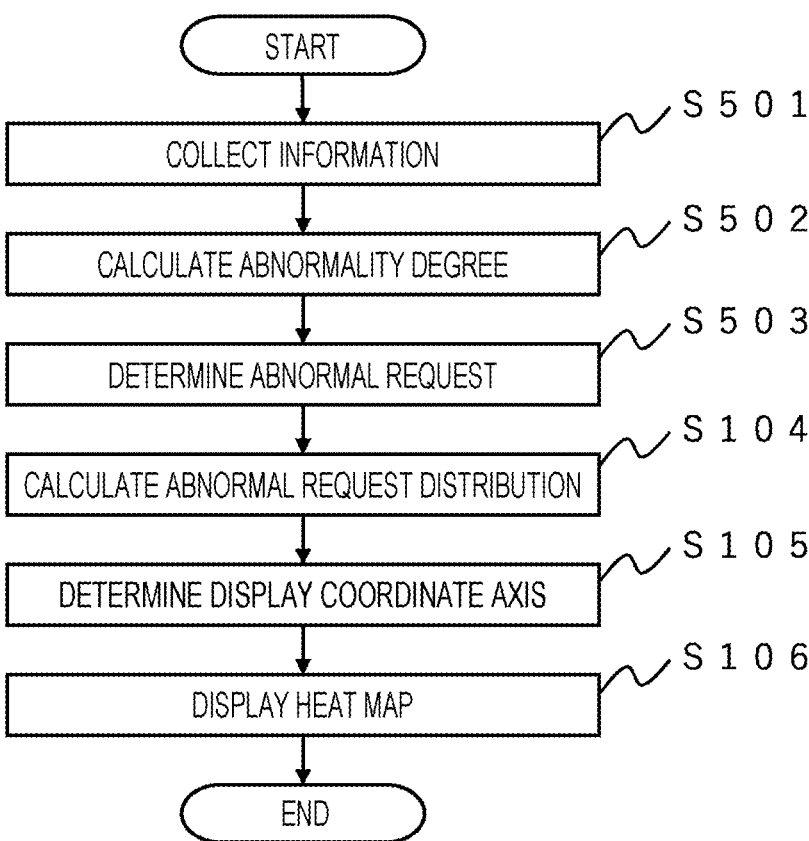
FIG. 14 is a flowchart for explaining another example of a system failure monitoring process.

FIG. 14 is a flowchart for explaining an example of a system failure monitoring process according to the present embodiment.

In the example of FIG. 14, the data collection unit 141 of the system failure monitoring device 100 collects pod/calculation node information 132 and error log information from the monitoring target system 1 and stores the collected information in the storage unit 130 (step S501). Specifically, the error log information is information relevant to an abnormality recorded in a pod 202 that has received a request when the abnormality occurs in a process according to the request.

Subsequently, for each of the requests, the abnormality degree calculation determination unit 143 calculates an abnormality degree of the request based on the pod/calculation node information 132 and the error log information (step S502). For example, the abnormality degree calculation determination unit 143 calculates the abnormality degree of the request, based on a ratio of abnormal requests with respect to requests having the same transmission source pod and the same transmission destination pod in a predetermined period, or a degree of importance of an abnormality occurring among requests having the same transmission source pod and the same transmission destination pod in a predetermined period.

Then, for each of the requests, the abnormality degree calculation determination unit 143 determines whether the abnormality of the request exceeds a threshold indicated by the threshold information 134, and determines whether the request is an abnormal request (step S503).

Thereafter, steps S104 to S106 described with reference to FIG. 8 are executed similarly to the first embodiment.

In the present embodiment as well, by checking the abnormal request distribution, a root cause of a system failure can be estimated. Therefore, the root cause of the system failure can be easily estimated.

The above-described embodiments of the present disclosure are examples for describing the present disclosure, and are not intended to limit the scope of the present disclosure only thereto. Those skilled in the art can embody the present disclosure in various other aspects without departing from the scope of the present disclosure.

REFERENCE SIGNS LIST

1 monitoring target system
2 client terminal 10 physical machine
100 system failure monitoring device
110 input unit
120 output unit
130 storage unit
140 arithmetic unit
141 data collection unit
142 processing time calculation unit
143 abnormality degree calculation determination unit
144 abnormal request distribution calculation unit
145 abnormal request visualization unit
150 communication unit
200 application container
202 calculation node
203 virtualization platform
205 physical machine

The invention claimed is:

1. A system failure monitoring device that monitors a monitoring target system including a plurality of components that execute processes according to requests, the system failure monitoring device comprising:

a collection unit that collects configuration information regarding each of the components and request information regarding each of the requests processed by each of the components;

a determination unit that determines, for each of the requests, whether the request is an abnormal request relevant to an abnormality of the monitoring target system, based on the configuration information and the request information; and a presentation unit that generates and presents visualized data indicating an abnormal request distribution obtained by plotting the abnormal request in a request space defined by a coordinate axis related to the requests, wherein the determination unit includes:

a processing time calculation unit that calculates, for each of the requests, a processing time required for a process according to the request, based on the configuration information and the request information; and a determination execution unit that, for each of the requests, determines whether the request is the abnormal request, based on a comparison value obtained by comparing the processing time of the request with a processing time of a comparison target request having a predetermined homogeneous relationship with the request, wherein the processing time of the request is a time obtained by subtracting a stand-by time from a response time, the response time being taken from when a component receives the request to when the component responds to the request, and the stand-by time being taken from when the component transmits a subordinate request corresponding to the request to another one of the components to when the component receives a response from the another component, wherein the comparison target request is a request having a same transmission source component, which is one of the components as a transmission source, and a same transmission destination component, which is another one of the components as a transmission destination, as the request, wherein one of the components provides a specific service, wherein the monitoring target system includes a plurality of components that provide a same service as the specific service, and wherein, when a number of requests having the same transmission source component and the same transmission destination component as the request is smaller than a predetermined required number, the determination execution unit substitutes, as the comparison target request, a request having the same service provided by the transmission source component and the same service provided by the transmission destination component as the request.

2. The system failure monitoring device according to claim 1, wherein the request information is error log information indicating a history of abnormalities related to the requests acquired in the monitoring target system, and the determination unit determines, for each of the requests, whether the request is an abnormal request based on the error log information.

3. The system failure monitoring device according to claim 1, wherein the presentation unit selects a display coordinate axis that is a coordinate axis to be used in the visualized data from a plurality of coordinate axes different from each other, based on a total distance that is a sum of distances between positions of respective abnormal requests in the request space and a position of a centroid between the abnormal requests for each of the plurality of coordinate axes.

4. The system failure monitoring device according to claim 3, wherein the coordinate axes are settable by a user.

5. The system failure monitoring device according to claim 1, wherein the determination unit calculates, for each of the requests, an abnormality degree obtained by evaluating a degree of relevance of the request to the abnormality of the monitoring target system based on the configuration information and the request information, and determines whether the request is an abnormal request based on the abnormality degree, and the visualized data is a heat map indicating a plot of the abnormal request with visual information according to the abnormality degree of the abnormal request.

6. A system failure monitoring method performed by a system failure monitoring device that monitors a monitoring target system including a plurality of components that execute processes according to requests, the system failure monitoring method comprising:

collecting configuration information regarding each of the components and request information regarding each of the requests processed by each of the components;

determining, for each of the requests, whether the request is an abnormal request relevant to an abnormality of the monitoring target system, based on the configuration information and the request information; and generating and presenting visualized data indicating an abnormal request distribution obtained by plotting the abnormal request in a request space defined by a coordinate axis related to the requests, wherein the determination step includes:

calculating, for each of the requests, a processing time required for a process according to the request, based on the configuration information and the request information; and determining, for each of the requests, whether the request is the abnormal request, based on a comparison value obtained by comparing the processing time of the request with a processing time of a comparison target request having a predetermined homogeneous relationship with the request, wherein the processing time of the request is a time obtained by subtracting a stand-by time from a response time, the response time being taken from when a component receives the request to when the component responds to the request, and the stand-by time being taken from when the component transmits a subordinate request corresponding to the request to another one of the components to when the component receives a response from the another component, wherein the comparison target request is a request having a same transmission source component, which is one of the components as a transmission source, and a same transmission destination component, which is another one of the components as a transmission destination, as the request, wherein one of the components provides a specific service, wherein the monitoring target system includes a plurality of components that provide a same service as the specific service, and wherein, when a number of requests having the same transmission source component and the same transmission destination component as the request is smaller than a predetermined required number, the determination execution unit substitutes, as the comparison target request, a request having the same service provided by the transmission source component and the same service provided by the transmission destination component as the request.

\* \* \* \* \*